United States Patent
Kikuchi et al.

(10) Patent No.: US 6,886,402 B2
(45) Date of Patent: May 3, 2005

(54) GAS FLOW RATE AND TEMPERATURE MEASURING ELEMENT

(75) Inventors: Masao Kikuchi, Tokyo (JP); Tomoya Yamakawa, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/610,595

(22) Filed: Jul. 2, 2003

(65) Prior Publication Data

US 2004/0055377 A1 Mar. 25, 2004

(30) Foreign Application Priority Data

Jul. 4, 2002 (JP) .................................. 2002-195913

(51) Int. Cl.[7] .................................................. G01F 1/68
(52) U.S. Cl. ................................................... 73/204.25
(58) Field of Search .............................. 73/202, 202.5, 73/204.11, 204.16, 204.17, 204.19, 204.22, 204.23, 204.25, 204.26, 116

(56) References Cited

U.S. PATENT DOCUMENTS 4,909,078 A * 3/1990 Sittler et al. ............. 73/204.26
4,912,975 A * 4/1990 Ohta et al. ............... 73/204.26

FOREIGN PATENT DOCUMENTS

| JP | 60-036916 A | 2/1985 |
| JP | 06-249693 A | 9/1994 |
| JP | 08-219838 A | 8/1996 |

OTHER PUBLICATIONS

Yutaka Nishimura, et al "Technique for measuring an intake air flow of an internal combustion engine in an automobile"(T.IEEE Japan, vol. 118–E,No. 6,'98,p. 300–303).

* cited by examiner

Primary Examiner—Edward Lefkowitz
Assistant Examiner—Takisha Miller
(74) Attorney, Agent, or Firm—Sughrue Mion, PLLC

(57) ABSTRACT

Gas temperature detection wiring is provided with a first wiring portion disposed parallel to and in close proximity to a flow rate detector portion for a length substantially equivalent to a length of the flow rate detector portion; and a second wiring portion disposed so as to extend from the first wiring portion to an end portion of a pectinate pattern of a gas temperature detector portion. The gas temperature detection wiring is formed so as to connect electrode terminals and the gas temperature detector portion. A high-thermal-resistance portion having increased thermal resistance is constructed by reducing a width of a portion of the second wiring portion.

8 Claims, 5 Drawing Sheets

GAS FLOW RATE AND TEMPERATURE MEASURING ELEMENT

BACKGROUND OF THE INVENTION

1. Field of the Invention

The present invention relates to a gas flow rate and temperature measuring element for measuring a flow rate of a fluid being measured, and relates to a gas flow rate and temperature measuring element used in a flow rate sensor for measuring an intake air flow rate of an internal combustion engine in an automobile, for example.

2. Description of the Related Art

Generally, in an automotive engine, etc., an air-fuel mixture including fuel and intake air is burnt in a combustion chamber in the engine body, and rotational output from the engine is extracted from the resulting combustion pressure, requiring that the intake air flow rate be detected in order to calculate the injection rate, etc., of the fuel with high precision.

Thermosensitive flow rate meters such as that described in Japanese Patent Laid-Open No. SHO 60-36916 (Gazette) or in "Intake Air Measurement Techniques for Automotive Engines" (The Transactions of the Institute of Electrical Engineers of Japan, pp 300–303, Vol. 118-E, No. 6, June, 1998), for example, are known as conventional techniques of this kind. These conventional thermosensitive flow rate meters are constructed such that a thermosensitive resistor for detecting a rate of air flow by means of heat transfer changes and an air temperature compensation resistor for compensating for air temperature at that time are each supported on tips of two electrically-conducting supports inserted through and supported by a holder. The holder of these conventional thermosensitive flow rate meters is mounted to a passage such that the thermosensitive resistor and the air temperature compensating resistor are disposed inside the passage to measure the flow rate of air flowing inside the passage.

In a conventional air flow rate measuring apparatus described in Japanese Patent Laid-Open No. HEI 8-219838 (Gazette), there is provided a thermosensitive resistor supported by a support pin disposed inside a subpassage disposed in a holder; and an air temperature compensating resistor supported by a support member which is separate from the holder. The holder and the support member of this conventional air flow rate measuring apparatus are mounted to a main passage such that the subpassage and the air temperature compensating resistor are disposed inside the main passage to measure the flow rate of air flowing inside the main passage.

However, in the conventional thermosensitive flow rate meters, because the thermosensitive resistor and the air temperature compensating resistor are supported by different electrically-conducting supports, one problem has been that the number of parts is increased, preventing reductions in parts costs and assembly costs. In addition, it is desirable for the thermosensitive resistor and the air temperature compensating resistor to be disposed in close proximity at a location at which the air flows stably, but because the thermosensitive resistor and the air temperature compensating resistor are supported by different electrically-conducting supports, another problem has been that there is a limit to how close the two can be disposed, making the air flow rate detecting precision poor.

Because the thermosensitive resistor and the air temperature compensating resistor are also supported by separate members in the first conventional air flow rate measuring apparatus, there are problems similar to those in the conventional thermosensitive flow rate meters.

A conventional gas flow rate and temperature measuring element capable of improving problems of this kind is described in Japanese Patent Laid-Open No. HEI 6-249693, for example. This conventional gas flow rate and temperature measuring element is constructed by adopting fine processing techniques such as etching techniques, thin-film film-formation techniques, etc., to form the thermosensitive resistor and the air temperature compensating resistor in close proximity on a single substrate made of silicon.

FIG. 9 is a top view showing a gas flow rate and temperature measuring element used in a conventional flow rate sensor, and FIG. 10 is a cross section taken along line X—X in FIG. 9 viewed from the direction of the arrows.

In the figures, an electrically-insulating support film 3 made of silicon nitride is formed on a front surface (a first surface) of a flat substrate 2 made of a single-crystal silicon, and a flow rate detector portion 4 and a gas temperature detector portion 5 are formed on the electrically-insulating support film 3 so as to be lined up in a direction perpendicular to a direction of flow A of a fluid being measured. Here, the gas temperature detector portion 5 is disposed near a first end portion of the flat substrate 2.

First to fourth flow rate detection electrode terminals 6a to 6d and first and second gas temperature detection electrode terminals 6e and 6f are formed on the electrically-insulating support film 3 near a second end portion of the flat substrate 2, first to fourth flow rate detection wiring 7a to 7d is formed on the electrically-insulating support film 3 so as to connect the first to fourth flow rate detection electrode terminals 6a to 6d and the flow rate detector portion 4, and first and second gas temperature detection wiring 7e and 7f is formed on the electrically-insulating support film 3 so as to connect the first and second gas temperature detection electrode terminals 6e and 6f and the gas temperature detector portion 5.

Furthermore, an electrically-insulating protective film 8 made of silicon nitride is formed by coating on the electrically-insulating support film 3 so as to cover the flow rate detector portion 4, the gas temperature detector portion 5, the first to fourth flow rate detection wiring 7a to 7d, and the first and second gas temperature detection wiring 7e and 7f.

First and second cavities 9 and 10 having a trapezoidal cross-sectional shape are formed under the flow rate detector portion 4 and the gas temperature detector portion 5, respectively, by partially removing the flat substrate 2 from a rear surface (a second surface) of the flat substrate 2 by alkali etching. Thus, the flow rate detector portion 4 and the gas temperature detector portion 5 have a diaphragm construction, reducing the heat capacity of the flow rate detector portion 4 and the gas temperature detector portion 5, enabling them to respond sensitively to changes in the flow rate and the temperature of the gas.

Here, the flow rate detector portion 4, the gas temperature detector portion 5, the first to fourth flow rate detection wiring 7a to 7d, and the first and second gas temperature detection wiring 7e and 7f are formed by using photoengraving techniques and etching techniques to pattern a platinum film constituting a thermosensitive resistor film formed on the electrically-insulating support film 3. The flow rate detector portion 4 and the gas temperature detector portion 5 are formed into pectinate (comb-like) patterns, the first to fourth flow rate detection wiring 7a to 7d being formed so as to connect each of the first to fourth flow rate detection electrode terminals 6a to 6d and end portions of the pectinate patterns of the flow rate detector portion 4 generally linearly, and the first and second gas temperature detection wiring 7e and 7f each being formed so as to pass by a side portion of the flow rate detector portion 4 and connect the first and second gas temperature detection electrode terminals 6e and 6f and end portions of the pectinate pattern of the gas temperature detector portion 5. This first and second gas temperature detection wiring 7e and 7f is provided with: first wiring portions 11 wired parallel to and in close proximity to the flow rate detector portion 4; and second wiring portions 12 extending from these first wiring portions 11 to the end portions of the pectinate pattern of the gas temperature detector portion 5.

A conventional gas flow rate and temperature measuring element 1 constructed in this manner is disposed such that the electrode terminals 6a to 6f are electrically connected to a control circuit (not shown) by means of bonding wires (not shown) and a direction of alignment between the flow rate detector portion 4 and the gas temperature detector portion 5 is perpendicular to the direction of flow A of air constituting the fluid being measured. The temperature of air flowing over the electrically-insulating protective film 8 is detected by means of the gas temperature detector portion 5.

A heating current is allowed to flow through the flow rate detector portion 4, heating the flow rate detector portion 4. The heat generated in the flow rate detector portion 4 is transferred to the air flowing over the flow rate detector portion 4, reducing the temperature of the flow rate detector portion 4. If the flow rate of the air is high, the quantity of heat transferred to the air from the flow rate detector portion 4 increases, increasing the reduction in the temperature of the flow rate detector portion 4. On the other hand, if the flow rate of the air is low, the quantity of heat transferred to the air from the flow rate detector portion 4 is reduced, making the reduction in the temperature of the flow rate detector portion 4 small.

The heating current flowing through the flow rate detector portion 4 is controlled by the control circuit such that the average temperature of the flow rate detector portion 4 is higher than the temperature of air detected by the gas temperature detector portion 5 by a predetermined amount. Thus, the heating current flowing through the flow rate detector portion 4 is a function of the flow rate of the air, the flow rate of the air being detected by extracting this heating current as an air mass flow rate signal. Consequently, in this kind of flow rate sensor, it is extremely important that the temperature of the air flowing over the flow rate detector portion 4 is measured accurately for the flow rate of the air to be detected accurately.

In the conventional gas flow rate and temperature measuring element 1 constructed in this manner, because the flow rate detector portion 4 and the gas temperature detector portion 5 are disposed on the flat substrate 2, the flow rate detector portion 4 and the gas temperature detector portion 5 are supported by a single member, enabling reductions in the number of parts, thereby enabling reductions in parts costs and assembly costs. Because the flow rate detector portion 4 and the gas temperature detector portion 5 can be disposed in close proximity to each other, reductions in size are enabled and the gas temperature detector portion 5 can detect the temperature of the air flowing over the flow rate detector portion 4. Thus, the average temperature of the flow rate detector portion 4 can be controlled so as to be higher by a predetermined amount than the temperature of the air flowing over the flow rate detector portion 4, improving the precision in detecting the flow rate of the air.

However, because portions of the first and second gas temperature detection wiring 7e and 7f connecting the first and second gas temperature detection electrode terminals 6e and 6f and the end portions of the pectinate pattern of the gas temperature detector portion 5, in other words, the first wiring portions 11, are disposed parallel to and in close proximity to the flow rate detector portion 4, heat generated in the flow rate detector portion 4 is conducted through the electrically-insulating support film 3 and the electrically-insulating protective film 8 to the first wiring portions 11, and in addition, heat generated in the flow rate detector portion 4 is transferred through the air to the first wiring portion 11 disposed downstream from the flow rate detector portion 4. Because the heat conveyed to the first wiring portions 11 is conducted through the second wiring portions 12 to the gas temperature detector portion 5, one problem has been that the gas temperature detector portion 5 can no longer detect the temperature of the air accurately, making the precision in detecting the flow rate of the air poor.

Particularly when the gas flow rate and temperature measuring element 1 are reduced in size, the distance between the first wiring portions 11 and the flow rate detector portion 4 cannot be adequately ensured, making the above-mentioned deterioration of the precision in detecting the flow rate of the air pronounced.

SUMMARY OF THE INVENTION

The present invention aims to solve the above problems and an object of the present invention is to provide a compact gas flow rate and temperature measuring element having high flow rate detection precision in which a high-thermal-resistance portion is disposed in a second wiring portion extending to a gas temperature detector portion from a first wiring portion disposed parallel to and in close proximity to a flow rate detector portion to reduce the quantity of heat conducted from the first wiring portion through the second wiring portion to the gas temperature detector portion, increasing the precision of the gas temperature detector portion in detecting the temperature of a fluid being measured by suppressing the influence of heat generated in the flow rate detector portion on the gas temperature detector portion.

Another object of the present invention is to provide a compact gas flow rate and temperature measuring element having high flow rate detection precision in which heat capacity of a first wiring portion disposed parallel to and in close proximity to a flow rate detector portion is increased, suppressing temperature increases in the first wiring portion when heat generated in the flow rate detector portion is conducted or otherwise transferred to the first wiring portion to reduce the quantity of heat transferred from the first wiring portion through the second wiring portion to the gas temperature detector portion, increasing the precision of the gas temperature detector portion in detecting the temperature of a fluid being measured by suppressing the influence of heat generated in the flow rate detector portion on the gas temperature detector portion.

With the above object in view, a gas flow rate and temperature measuring element includes a flat substrate; a flow rate detector portion made of a thermosensitive resistor film formed on a front surface of the flat substrate; and a gas temperature detector portion made of a thermosensitive resistor film formed on the front surface of the flat substrate so as to be separated from the flow rate detector portion. Another, the gas flow rate and temperature measuring element includes flow rate detection and gas temperature detection electrode terminals formed on an end portion of the front surface of the flat substrate across the flow rate detector portion from the gas temperature detector portion. Still another, the gas flow rate and temperature measuring element includes flow rate detection wiring formed on the front surface of the flat substrate so as to connect the flow rate detection electrode terminals and the flow rate detector portion. Further, the gas flow rate and temperature measuring element includes gas temperature detection wiring formed on the front surface of the flat substrate so as to connect the gas temperature detection electrode terminals and the gas temperature detector portion. Still further, the gas flow rate and temperature measuring element includes cavities formed from a rear surface side of the flat substrate under the flow rate detector portion and the gas temperature detector portion, respectively. The gas flow rate and temperature measuring element is characterized in that the gas temperature detection wiring is provided with a first wiring portion disposed parallel to and in close proximity to the flow rate detector portion for a length substantially equivalent to a length of the flow rate detector portion and a second wiring portion disposed so as to extend from the first wiring portion to the gas temperature detector portion, a high-thermal-resistance portion being formed in at least a portion of the second wiring portion.

Thus, because heat transfer from the flow rate detector portion through the first wiring portion and the second wiring portion to the gas temperature detector portion is suppressed at the high-thermal-resistance portion, the precision of the gas temperature detector portion in detecting air temperature is increased, thereby providing a compact gas flow rate and temperature measuring element having high flow rate detection precision.

With the above object in view, a gas flow rate and temperature measuring element includes a flat substrate; a flow rate detector portion made of a thermosensitive resistor film formed on a front surface of the flat substrate; and a gas temperature detector portion made of a thermosensitive resistor film formed on the front surface of the flat substrate so as to be separated from the flow rate detector portion. Another, the gas flow rate and temperature measuring element includes flow rate detection and gas temperature detection electrode terminals formed on an end portion of the front surface of the flat substrate across the flow rate detector portion from the gas temperature detector portion. Still another, the gas flow rate and temperature measuring element includes flow rate detection wiring formed on the front surface of the flat substrate so as to connect the flow rate detection electrode terminals and the flow rate detector portion. Further, the gas flow rate and temperature measuring element includes gas temperature detection wiring formed on the front surface of the flat substrate so as to connect the gas temperature detection electrode terminals and the gas temperature detector portion. Still farther, the gas flow rate and temperature measuring element includes cavities formed from a rear surface side of the flat substrate under the flow rate detector portion and the gas temperature detector portion, respectively. The gas flow rate and temperature measuring element is characterized in that the gas temperature detection wiring is provided with a first wiring portion disposed parallel to and in close proximity to the flow rate detector portion for a length substantially equivalent to a length of the flow rate detector portion and a second wiring portion disposed so as to extend from the first wiring portion to the gas temperature detector portion, the first wiring portion being formed into a thicker film than the flow rate detector portion and the gas temperature detector portion.

Thus, because the thermal capacity of the first wiring portion is increased and temperature increases in the first wiring portion resulting from heat transport from the flow rate detector portion are small, the precision of the gas temperature detector portion in detecting air temperature is increased, thereby providing a compact gas flow rate and temperature measuring element having high flow rate detection precision.

With the above object in view, a gas flow rate and temperature measuring element includes a flat substrate; a flow rate detector portion made of a thermosensitive resistor film formed on a front surface of the flat substrate; and a gas temperature detector portion made of a thermosensitive resistor film formed on the front surface of the flat substrate so as to be separated from the flow rate detector portion. Another, the gas flow rate and temperature measuring element includes flow rate detection and gas temperature detection electrode terminals formed on an end portion of the front surface of the flat substrate across the flow rate detector portion from the gas temperature detector portion. Still another, the gas flow rate and temperature measuring element includes flow rate detection wiring formed on the front surface of the flat substrate so as to connect the flow rate detection electrode terminals and the flow rate detector portion. Further, the gas flow rate and temperature measuring element includes gas temperature detection wiring formed on the front surface of the flat substrate so as to connect the gas temperature detection electrode terminals and the gas temperature detector portion. Still further, the gas flow rate and temperature measuring element includes cavities formed from a rear surface side of the flat substrate under the flow rate detector portion and the gas temperature detector portion, respectively. The gas flow rate and temperature measuring element is characterized in that the gas temperature detection wiring is provided with a first wiring portion disposed parallel to and in close proximity to the flow rate detector portion for a length substantially equivalent to a length of the flow rate detector portion and a second wiring portion disposed so as to extend from the first wiring portion to the gas temperature detector portion, at least a portion of the first wiring portion being constructed using a material whose electrical resistance has less temperature dependency than that of the flow rate detector portion and the gas temperature detector portion.

Thus, because the ratio of changes in resistance in the first wiring portion relative to changes in resistance between the gas temperature detection electrode terminals resulting from the temperature changes is reduced, the precision of the gas temperature detector portion in detecting air temperature is increased, thereby providing a compact gas flow rate and temperature measuring element having high flow rate detection precision.

DETAILED DESCRIPTION OF THE PREFERRED EMBODIMENTS

Preferred embodiments of the present invention will now be explained with reference to the drawings.

Embodiment 1

Figure 1:
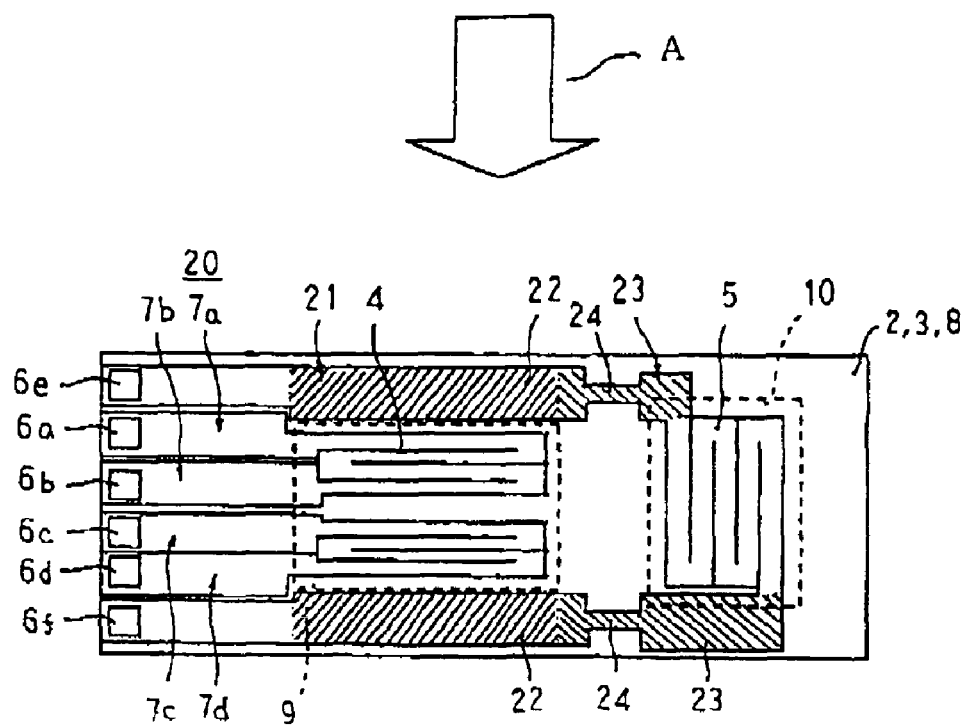
FIG. 1 is a top view showing a gas flow rate and temperature measuring element according to Embodiment 1 of the present invention.

FIG. 1 is a top view showing a gas flow rate and temperature measuring element according to Embodiment 1 of the present invention Moreover, in the figure, portions identical to or corresponding to those in the conventional gas flow rate and temperature measuring element 1 will be given the same numbering and explanation thereof will be omitted. Furthermore, in FIG. 1, hatching indicates regions of formation of first wiring portions 22 and second wiring portions 23.

In FIG. 1, in a gas flow rate and temperature measuring element 20, gas temperature detection wiring 21 has first wiring portions 22 disposed parallel to and in close proximity to a flow rate detector portion 4 for a length generally equivalent to that of the flow rate detector portion 4; and second wiring portions 23 disposed so as to extend from the first wiring portions 22 to end portions of a pectinate pattern of a gas temperature detector portion 5, the gas temperature detection wiring 21 being formed so as to connect first and second gas temperature detection electrode terminals 6e and 6f and the gas temperature detector portion 5. A width of portions of the second wiring portions 23 is formed so as to be reduced, reducing cross-sectional area perpendicular to a direction of heat conduction. These portions where the cross-sectional area is reduced have a high thermal resistance and constitute high-thermal-resistance portions 24.

Moreover, the rest of this embodiment is constructed in a similar manner to the conventional gas flow rate and temperature measuring element 1.

A method for manufacturing this gas flow rate and temperature measuring element 20 will now be explained.

First, the electrically-insulating support film 3 is formed on the flat substrate 2, which is made of a single-crystal silicon, by forming a film of silicon nitride to a thickness of 1.0 $\mu$m, for example, over the entire front surface of the flat substrate 2 by a method such as sputtering, chemical vapor deposition (CVD), etc. Next, a film of platinum constituting a thermosensitive resistance material is formed to a thickness of 0.2 $\mu$m, for example, over an entire front surface of the electrically-insulating support film 3 by a method such as vapor deposition, sputtering, etc. Then, the flow rate detector portion 4 and the gas temperature detector portion 5 having pectinate patterns, the electrode terminals 6a to 6f, the flow rate detection wiring 7a to 7d, and the gas temperature detection wiring 21 are formed by patterning the platinum film using a method such as photoengraving, wet etching (or dry etching), etc. At this time, the width of portions of the second wiring portions 23 constituting the gas temperature detection wiring 21 is formed so as to be reduced to form the high-thermal-resistance portions 24.

In addition, the electrically-insulating protective film 8 is formed by forming a film of silicon nitride to a thickness of 1.0 $\mu$m, for example, over the entire front surface of the electrically-insulating support film 3 by a method such as sputtering, CVD, etc. Then, the electrically-insulating protective film 8 is removed above the electrode terminals 6a to 6f using a method such as photoengraving, wet etching (or dry etching), etc.

Next, a rear-surface protective film (not shown) is formed by applying a resist to the entire rear surface of the flat substrate 2. Then, etching apertures (not shown) are formed by removing portions of the rear-surface protective film using photoengraving, etc. Thereafter, the first and second cavities 9 and 10 are formed by removing portions of the flat substrate 1 so as to extend to the electrically-insulating support film 3 from the rear surface side of the flat substrate 2 by applying alkali etching, for example. Thus, the flow rate detector portion 4 and the gas temperature detector portion 5 are formed above the first and second cavities 9 and 10. Hence, the flow rate detector portion 4 and the gas temperature detector portion 5 have a diaphragm construction, reducing the heat capacity of the flow rate detector portion 4 and the gas temperature detector portion 5, enabling them to respond sensitively to changes in the flow rate and the temperature of the gas. Here, KOH, tetramethyl ammonium hydroxide (TMAH), NaOH, etc., are used as the etchant.

A gas flow rate and temperature measuring element 20 prepared in this manner is disposed, in a similar manner to the conventional gas flow rate and temperature measuring element 1, such that portions of the electrode terminals 6a to 6f where the electrically-insulating protective film 8 is removed are electrically connected to a control circuit (not shown) by means of bonding wires (not shown), and a direction of alignment between the flow rate detector portion 4 and the gas temperature detector portion 5 is perpendicular to a direction of flow A of air constituting a fluid being measured. The air flows over the electrically-insulating protective film 8, and the temperature of the air is detected by means of the gas temperature detector portion 5.

The heating current flowing through the flow rate detector portion 4 is controlled by the control circuit such that the average temperature of the flow rate detector portion 4 is higher than the temperature of the air detected by the gas temperature detector portion 5 by a predetermined amount. The flow rate of the air is detected by extracting this heating current as an air mass flow rate signal.

In Embodiment 1, the heat generated in the flow rate detector portion 4 is also conducted through the electrically-insulating support film 3 and the electrically-insulating protective film 8 to the first wiring portions 22 disposed parallel to and in close proximity to the flow rate detector portion 4, and in addition, the heat generated in the flow rate detector portion 4 is also transferred through the air to the first wiring portion 11 disposed downstream from the flow rate detector portion 4.

However, because portions of the second wiring portions 23 are formed so as to have reduced width and constitute high-thermal-resistance portions 24 in which the heat-conducting cross-sectional area perpendicular to the direction of heat conduction is reduced, when heat conveyed from the flow rate detector portion 4 to the first wiring portions 22 is conducted to the high-thermal-resistance portions 24 of the second wiring portions 23, it is diffused by the high-thermal-resistance portions 24 to the surrounding area and to the rear surface side of the flat substrate 2, reducing the quantity of heat conducted from the first wiring portions 22 through the second wiring portions 23 to the gas temperature detector portion 5. Thus, reductions in the precision of the gas temperature detector portion 5 in detecting the temperature of the air resulting from the generation of heat by the flow rate detector portion 4 are suppressed, increasing the precision in detecting the temperature of the air.

In Embodiment 1, because the flow rate detector portion 4 and the gas temperature detector portion 5 are disposed on the flat substrate 2 in this manner, the flow rate detector portion 4 and the gas temperature detector portion 5 are supported by a single member, enabling reductions in the number of parts, thereby enabling reductions in parts costs and assembly costs. Because the flow rate detector portion 4 and the gas temperature detector portion 5 can be disposed in close proximity, reductions in size are enabled. In addition, because the high-thermal-resistance portions 24 are formed in portions of the second wiring portions 23, the heat generated in the flow rate detector portion 4 is less likely to be conducted through the first and second wiring portions 22 and 23 to the gas temperature detector portion 5, enabling the gas temperature detector portion 5 to detect the temperature of the air flowing over the flow rate detector portion 4 accurately. Thus, the average temperature of the flow rate detector portion 4 can be controlled so as to be higher by a predetermined amount than the temperature of the air flowing over the flow rate detector portion 4, improving the precision in detecting the flow rate of the air.

According to Embodiment 1, because the high-thermal-resistance portions 24 are formed by reducing the width of portions of the second wiring portions 23, the high-thermal-resistance portions 24 can be formed simultaneously when the flow rate detector portion 4, the gas temperature detector portion 5, the electrode terminals 6a to 6f, the flow rate detection wiring 7a to 7d, and the gas temperature detection wiring 21 are being formed by patterning the platinum film formed on the electrically-insulating support film 3. In other words, the high-thermal-resistance portions 24 can be formed without increasing the number of manufacturing processes, increasing the rate of production of the gas flow rate and temperature measuring element.

Moreover, in Embodiment 1 above, platinum is used for the thermosensitive resistance material, but the thermosensitive resistance material is not limited to platinum provided that it is a material in which temperature dependency of specific resistance changes is high and linearity relative to temperature changes is high and, for example, nickel, a nickel-iron alloy (such as permalloy, trademark of the Western Electric Company), etc., can be used.

Furthermore, the structural elements in Embodiment 1 above are not limited to the above film thicknesses and may be appropriately set to match desired specifications. Moreover, the same also applies to the rest of the embodiments below.

Embodiment 2

Figure 2:
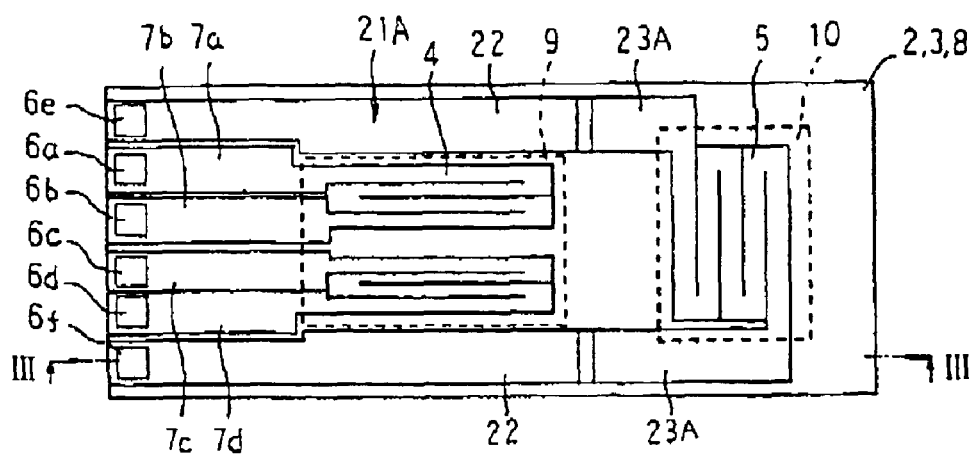
FIG. 2 is a top view showing a gas flow rate and temperature measuring element according to Embodiment 2 of the present invention.
Figure 3:
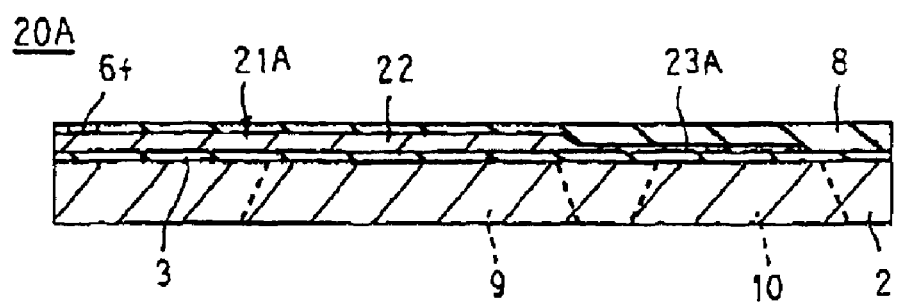
FIG. 3 is a cross section taken along line III—III in FIG. 2 viewed from the direction of the arrows.

FIG. 2 is a top view showing a gas flow rate and temperature measuring element according to Embodiment 2 of the present invention, and FIG. 3 is a cross section taken along line III—III in FIG. 2 viewed from the direction of the arrows.

In FIGS. 2 and 3, gas temperature detection wiring 21A has first wiring portions 22 disposed parallel to and in close proximity to a flow rate detector portion 4 for a length generally equivalent to that of the flow rate detector portion 4; and second wiring portions 23A disposed so as to extend from the first wiring portions 22 to end portions of a pectinate pattern of a gas temperature detector portion 5, the gas temperature detection wiring 21 being formed so as to connect first and second gas temperature detection electrode terminals 6e and 6f and first and second ends of the pectinate pattern of the gas temperature detector portion 5. The film thickness of the second wiring portions 23A is formed so as to be thinner than that of the first wiring portions 22.

Moreover, Embodiment 2 is constructed in a similar manner to Embodiment 1 above except for the fact that thin second wiring portions 23A are formed instead of second wiring portions 23 having high-thermal-resistance portions 24 of narrow width.

A method for manufacturing this gas flow rate and temperature measuring element 20A will now be explained.

First, the electrically-insulating support film 3 is formed on the flat substrate 2 by forming a film of silicon nitride to a thickness of 1.0 μm, for example, over the entire front surface of the flat substrate 2. Next, a film of platinum is formed to a thickness of 0.1 μm, for example, over an entire front surface of the electrically-insulating support film 3. Then, a resist is formed above a region of formation of the second wiring portions 23A using a photoengraving technique, and then a film of platinum is formed to a thickness of 0.1 μm, for example, over the entire front surface of the electrically-insulating support film 3.

Next, the resist above the region of formation of the second wiring portions 23A is removed, then the flow rate detector portion 4 and the gas temperature detector portion 5 having pectinate patterns, the electrode terminals 6a to 6f, the flow rate detection wiring 7a to 7d, and the gas temperature detection wiring 21A are formed by patterning the platinum film using a method such as photoengraving, wet etching (or dry etching), etc.

Next, the electrically-insulating protective film 8 is formed by forming a film of silicon nitride to a thickness of 1.0 μm, for example, over the entire front surface of the electrically-insulating support film 3. Then, the electrically-insulating protective film 8 is removed above the electrode terminals 6a to 6f. Finally, the first and second cavities 9 and 10 are formed in a similar manner to Embodiment 1 above to obtain the gas flow rate and temperature measuring element 20A.

In the gas flow rate and temperature measuring element 20A prepared in this manner, the film thickness of the first wiring portions 22 is formed to 0.2 μm in a similar manner to Embodiment 1 above, and the film thickness of the second wiring portions 23A is formed to 0.1 μm, for example. Thus, the heat-conducting cross-sectional area perpendicular to the direction of heat conduction in the second wiring portions 23A is smaller than the heat-conducting cross-sectional area perpendicular to the direction of heat conduction in the first wiring portions 22. Consequently, thermal resistance is greater in the second wiring portions 23A than in the first wiring portions 22, the whole of each of the second wiring portions 23A constituting a high-thermal-resistance portion.

In this gas flow rate and temperature measuring element 20A, the heat generated in the flow rate detector portion 4 is also conducted through the electrically-insulating support film 3 and the electrically-insulating protective film 8 to the first wiring portions 22 disposed parallel to and in close proximity to the flow rate detector portion 4, and in addition, the heat generated in the flow rate detector portion 4 is also transferred through the air to the first wiring portion 11 disposed downstream from the flow rate detector portion 4.

However, because the second wiring portions 23A are formed so as to have reduced thickness and constitute high-thermal-resistance portions having a small cross-sectional area perpendicular to the direction of heat conduction, when heat conveyed from the flow rate detector portion 4 to the first wiring portions 22 is conducted to the second wiring portions 23A, it is diffused to the surrounding area and to the rear surface side of the flat substrate 2, reducing the quantity of heat conducted toward the gas temperature detector portion 5. Thus, reductions in the precision of the gas temperature detector portion 5 in detecting the temperature of the air resulting from the generation of heat by the flow rate detector portion 4 are suppressed, increasing the precision in detecting the temperature of the air.

Moreover, in Embodiment 2 above, the whole of each of the second wiring portions is constituted into a high-thermal-resistance portion by reducing the overall film thickness of the second wiring portions, but portions of each of the second wiring portions may also be constituted into high-thermal-resistance portions having reduced cross-sectional area by reducing the film thickness of a portion of each of the second wiring portions. In that case, the high-thermal-resistance portions will be formed so as to extend across the heat transfer pathway of the second wiring portions.

Embodiment 3

In Embodiments 1 and 2 above, the quantity of heat conducted to the gas temperature detector portion 5 is reduced by forming a high-thermal-resistance portion in at least a portion of the heat conduction pathway in the second wiring portions to suppress the transfer of heat at the high-thermal-resistance portion, but in Embodiment 3, the quantity of heat conducted to the gas temperature detector portion 5 is reduced by forming high-thermal-capacity portions in the first wiring portions 22B to suppress temperature increases in the first wiring portions 22B resulting from heat conveyed from the flow rate detector portion 4 to the first wiring portions 22B.

Figure 4:
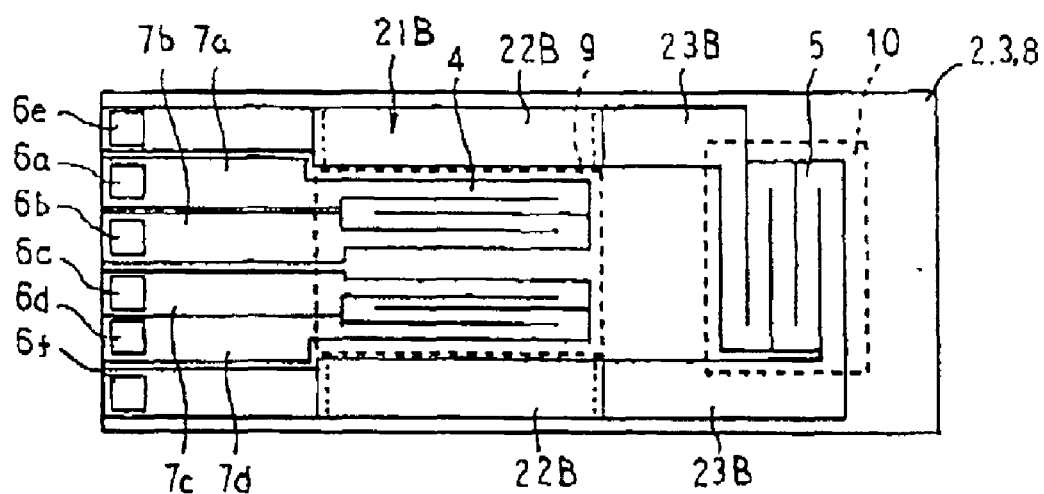
FIG. 4 is a top view showing a gas flow rate and temperature measuring element according to Embodiment 3 of the present invention.

FIG. 4 is a top view showing a gas flow rate and temperature measuring element according to Embodiment 3 of the present invention.

In FIG. 4, gas temperature detection wiring 21B has first wiring portions 22B disposed parallel to and in close proximity to a flow rate detector portion 4 for a length generally equivalent to that of the flow rate detector portion 4; and second wiring portions 23B disposed so as to extend from the first wiring portions 22B to end portions of a pectinate pattern of a gas temperature detector portion 5, the gas temperature detection wiring 21B being formed so as to connect first and second gas temperature detection electrode terminals 6e and 6f and first and second ends of the pectinate pattern of the gas temperature detector portion 5. The film thickness of the first wiring portions 22B is formed so as to be thicker than that of the flow rate detector portion 4, the gas temperature detector portion 5, and the second wiring portions 23B, constituting high-thermal-capacity portions.

A method for manufacturing a gas flow rate and temperature measuring element 20B according to Embodiment 3 will now be explained.

First, the electrically-insulating support film 3 is formed on the flat substrate 2 by forming a film of silicon nitride to a thickness of 1.0 $\mu$m, for example, over the entire front surface of the flat substrate 2. Next, a film of platinum is formed to a thickness of 0.2 $\mu$m, for example, over an entire front surface of the electrically-insulating support film 3. Then, a resist is formed so as to be open above a region of formation of the first wiring portions 22B using a photoengraving technique, and then a film of platinum is formed to a thickness of 0.1 $\mu$m, for example, over the entire front surface of the electrically-insulating support film 3.

Next, the resist is removed, then the flow rate detector portion 4 and the gas temperature detector portion 5 having pectinate patterns, the electrode terminals 6a to 6f, the flow rate detection wiring 7a to 7d, and the gas temperature detection wiring 21B are formed by patterning the platinum film using a method such as photoengraving, wet etching (or dry etching), etc.

Then, the electrically-insulating protective film 8 and the first and second cavities 9 and 10 are formed in a similar manner to Embodiment 2 above to obtain the gas flow rate and temperature measuring element 20B.

In the gas flow rate and temperature measuring element 20B prepared in this manner, the film thickness of the flow rate detector portion 4, the gas temperature detector portion 5, and the second wiring portions 23B is formed to 0.2 $\mu$m, for example, and the film thickness of the first wiring portions 22B is formed to 0.3 $\mu$m, for example. Thus, because the first wiring portions 22B are formed so as have a thicker film thickness, the first wiring portions 22B constitute high-thermal-capacity portions having a large thermal capacity.

When the heat generated in the flow rate detector portion 4 is conveyed through the electrically-insulating support film 3 and the electrically-insulating protective film 8 or through the air to the first wiring portions 22B, the temperature of the first wiring portions 22B rises in proportion to their thermal capacity, but because the thermal capacity of the first wiring portions 22B is large, temperature increases in the first wiring portions 22B are reduced compared to Embodiments 1 and 2 above. Thus, the quantity of heat transferred from the flow rate detector portion 4 through the first wiring portions 22B and the second wiring portions 23B to the gas temperature detector portion 5 is reduced, suppressing deterioration in the precision of the gas temperature detector portion 5 in detecting the temperature of the air.

Because the first wiring portions 22B are formed so as have a thicker film thickness, electrical resistance in the first wiring portions 22B is also reduced. Thus, the ratio of electrical resistance in the first wiring portions 22B relative to electrical resistance between the first and second gas temperature detection electrode terminals 6e and 6f is reduced, increasing the precision of the gas temperature detector portion 5 in detecting the temperature of the air.

Now, wire bonding is the method generally used to extract the electrical signals from the electrode terminals 6a to 6f to other circuitry. This wire bonding involves metallically joining to the electrode terminals 6a to 6f bonding wires having a diameter of tens to hundreds of $\mu$m, and materials such as aluminum, gold, copper, etc., or materials in which additional elements are added to these metals, are generally used in the bonding wires. This joining is performed by applying mechanical energy such as ultrasonic vibration, etc., and in some cases, is performed in combination with thermal energy using a method such as substrate heating, etc.

Because this wire bonding uses mechanical energy for joining, the electrode terminals 6a to 6f and the vicinity thereof and the flat substrate 2 directly under the electrode terminals 6a to 6f are subjected to damage. Thus, it is important to suppress damage by wire bonding in order to increase production stability in the wire bonding process and reliability of the gas flow rate and temperature measuring element.

In Embodiment 3, the electrode terminals 6a to 6f may also be formed to a film thickness equivalent to that of the first wiring portions 22B. In that case, the film thickness of the electrode terminals 6a to 6f is thicker than that of Embodiments 1 and 2 above, and the electrode terminals 6a to 6f function as a buffer layer against damage by wire bonding. Thus, damage to the electrode terminals 6a to 6f and the vicinity thereof, as well as to the flat substrate 2 directly under the electrode terminals 6a to 6f due to wire bonding is reduced, thereby increasing production stability in the wire bonding process and reliability of the gas flow rate and temperature measuring element.

In Embodiment 3 above, the second wiring portions 23B are formed to a film thickness equivalent to that of the flow rate detector portion 4 and the gas temperature detector portion 5, but the second wiring portions 23B may also be formed to a film thickness equivalent to that of the first wiring portions 22B. In that case, temperature increases resulting from heat conduction are also reduced in the second wiring portions 22B, and electrical resistance is also reduced, further increasing the precision of the gas temperature detector portion 5 in detecting the temperature of the air.

Furthermore, in Embodiment 3 above, high-thermal-resistance portions may also be formed in portions of the second wiring portions 23B. In that case, the quantity of heat conducted to the gas temperature detector portion 5 through the second wiring portions is reduced by the high-thermal-resistance portions, further increasing the precision of the gas temperature detector portion 5 in detecting the temperature of the air.

Embodiment 4

Figure 5:
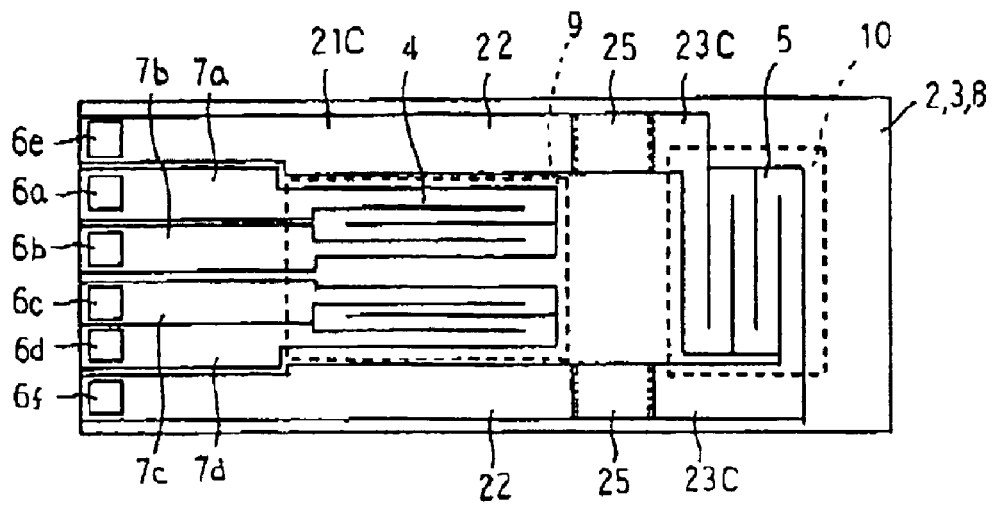
FIG. 5 is a top view showing a gas flow rate and temperature measuring element according to Embodiment 4 of the present invention.

FIG. 5 is a top view showing a gas flow rate and temperature measuring element according to Embodiment 4 of the present invention.

In FIG. 5, gas temperature detection wiring 21C has first wiring portions 22 disposed parallel to and in close proximity to a flow rate detector portion 4 for a length generally equivalent to that of the flow rate detector portion 4; and second wiring portions 23C disposed so as to extend from the first wiring portions 22 to end portions of a pectinate pattern of a gas temperature detector portion 5, the gas temperature detection wiring 21C being formed so as to connect first and second gas temperature detection electrode terminals 6e and 6f and first and second ends of the pectinate pattern of the gas temperature detector portion 5. High-thermal-resistance portions 25 made of a material having a lower coefficient of thermal conductivity than that of the material in the first and second wiring portions 22 and 23C are formed in portions of the second wiring portions 23C.

Moreover, Embodiment 4 is constructed in a similar manner to Embodiment 1 above except for the fact that thin second wiring portions 23C are formed instead of second wiring portions 23 having high-thermal-resistance portions 25 made of a material having a low coefficient of thermal conductivity.

A method for manufacturing a gas flow rate and temperature measuring element 20C will now be explained.

First, the electrically-insulating support film 3 is foxed on the flat substrate 2 by forming a film of silicon nitride to a thickness of 1.0 $\mu$m, for example, over the entire front surface of the flat substrate 2. Next, a film of platinum is formed to a thickness of 0.2 $\mu$m, for example, over an entire front surface of the electrically-insulating support film 3.

Next, the flow rate detector portion 4 and the gas temperature detector portion 5 having pectinate patterns, the electrode terminals 6a to 6f, the flow rate detection wiring 7a to 7d, and the gas temperature detection wiring 21C are formed by patterning the platinum film using a method such as photoengraving, wet etching (or dry etching), etc. At this time, portions of the second wiring portions 23C are removed so as to cut across the heat conduction pathway.

Next, the high-thermal-resistance portions 25 are prepared by forming a film of titanium to a thickness of 0.2 $\mu$m, for example, on the front surface of the electrically-insulating support film 3 so as to link the removed portions of the second wiring portions 23C.

Next, the electrically-insulating protective film 8 is formed by forming a film of silicon nitride to a thickness of 1.0 $\mu$m, for example, over the entire front surface of the electrically-insulating support film 3. Then, the electrically-insulating protective film 8 is removed above the electrode terminals 6a to 6f. Finally, the first and second cavities 9 and 10 are formed in a similar manner to Embodiment 1 above to obtain the gas flow rate and temperature measuring element 20C.

In the gas flow rate and temperature measuring element 20C prepared in this manner, high-thermal-resistance portions 25 made of titanium, which has a lower coefficient of thermal conductivity than that of platinum, are formed on portions of the second wiring portions 23C so as to extend across the heat conduction pathway.

Thus, when heat conveyed from the flow rate detector portion 4 to the first wiring portions 22 is conducted to the high-thermal-resistance portions 25 formed in portions of the second wiring portions 23C, it is diffused to the surrounding area and to the rear surface side of the flat substrate 2, reducing the quantity of heat conducted toward the gas temperature detector portion 5. Thus, reductions in the precision of the gas temperature detector portion 5 in detecting the temperature of the air resulting from the generation of heat by the flow rate detector portion 4 are suppressed, increasing the precision in detecting the temperature of the air.

Moreover, in Embodiment 4 above, the high-thermal-resistance portions 25 may also be formed so as to have a width narrower than that of the second wiring portions 23C. Because the cross-sectional area of the heat conduction pathway of the high-thermal-resistance portions 25 is then reduced and the heat resistance is further increased, heat transfer from the first wiring portions 22 to the gas temperature detector portion 5 through the second wiring portions 23C can be further reduced.

In Embodiment 4 above, titanium is used for the material in the high-thermal-resistance portions 25, but the material in the high-thermal-resistance portions 25 is not limited to titanium provided that it is a material having a lower coefficient of thermal conductivity than that of the material in the first and second wiring portions 22 and 23C, the latter in this case being platinum, and for example, tantalum, tungsten, molybdenum, etc., can be used.

Embodiment 5

Figure 6:
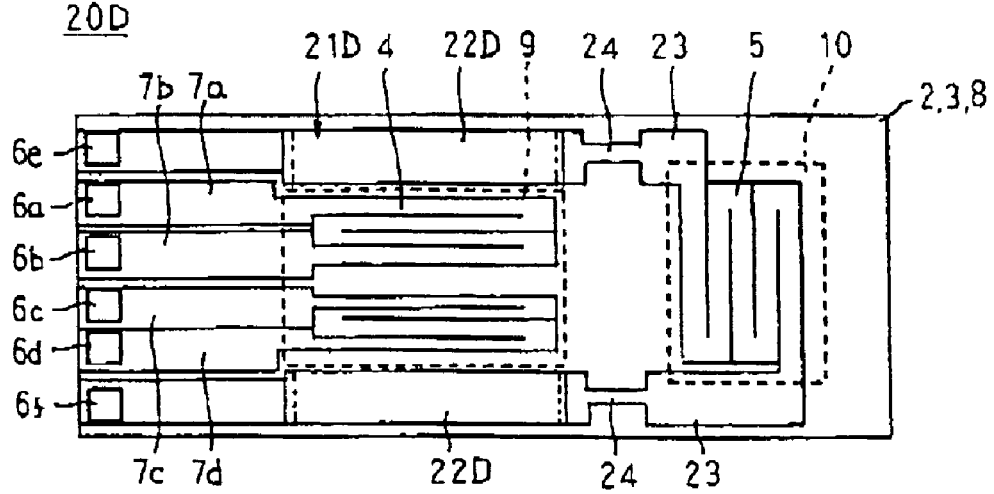
FIG. 6 is a top view showing a gas flow rate and temperature measuring element according to Embodiment 5 of the present invention.

FIG. 6 is a top view showing a gas flow rate and temperature measuring element according to Embodiment 5 of the present invention.

In FIG. 6, gas temperature detection wiring 21D has first wiring portions 22D disposed parallel to and in close proximity to a flow rate detector portion 4 for a length generally equivalent to that of the flow rate detector portion 4; and second wiring portions 23D disposed so as to extend from the first wiring portions 22D to end portions of a pectinate pattern of a gas temperature detector portion 5, high-thermal-resistance portions 24 being formed in portions of the second wiring portions 23, and the gas temperature detection wiring 21D being formed so as to connect first and second gas temperature detection electrode terminals 6e and 6f and first and second ends of the pectinate pattern of the gas temperature detector portion 5. The first wiring portions 22D are made of a material in which the temperature dependency of the resistance is less than that of the material in the flow rate detector portion 4 and the gas temperature detector portion 5, the latter in this case being platinum.

Moreover, Embodiment 5 is constructed in a similar manner to Embodiment 1 above except for the fact that first wiring portions 22D made of a material in which the temperature dependency of the resistance is less are formed instead of first wiring portions 22 made of a thermosensitive resistance material.

A method for manufacturing a gas flow rate and temperature measuring element 20D will now be explained.

First, the electrically-insulating support film 3 is formed on the flat substrate 2 by forming a film of silicon nitride to a thickness of 1.0 $\mu$m, for example, over the entire front surface of the flat substrate 2. Next, a film of platinum is formed to a thickness of 0.2 $\mu$m, for example, over an entire front surface of the electrically-insulating support film 3.

Next, the flow rate detector portion 4 and the gas temperature detector portion 5 having pectinate patterns, the electrode terminals 6a to 6f, the flow rate detection wiring 7a to 7d, and the gas temperature detection wiring 21D are formed by patterning the platinum film using a method such as photoengraving, wet etching (or dry etching), etc. At this time, portions corresponding to the first wiring portions 22D are removed.

Next, the first wiring portions 22D are prepared by forming a film of aluminum to a thickness of 0.2 $\mu$m, for example, on the front surface of the electrically-insulating support film 3 so as to link the removed portions of the gas temperature detection wiring 21D.

Next, the electrically-insulating protective film 8 is formed by forming a film of silicon nitride to a thickness of 1.0 $\mu$m, for example, over the entire front surface of the electrically-insulating support film 3. Then, the electrically-insulating protective film 8 is removed above the electrode terminals 6a to 6f. Finally, the first and second cavities 9 and 10 are formed in a similar manner to Embodiment 1 above to obtain the gas flow rate and temperature measuring element 20D.

In the gas flow rate and temperature measuring element 20D prepared in this manner, because the first wiring portions 22D are made of aluminum, the temperature dependency of the resistance in the first wiring portions 22D is small compared to that of the flow rate detector portion 4 and the gas temperature detector portion 5 made of platinum.

Thus, even if heat generated in the flow rate detector portion 4 is conveyed to the first wiring portions 22D and the temperature of the first wiring portions 22D rises, changes in resistance in the first wiring portions 22D are extremely small compared to changes in resistance in the gas temperature detector portion 5. Consequently, the ratio of changes in resistance of the first wiring portions 22D relative to changes in resistance between the electrode terminals 6e and 6f resulting from temperature changes is extremely small, increasing the precision of the gas temperature detector portion 5 in detecting the temperature of the air.

Because the first wiring portions 22D are made of a different material than the flow rate detector portion 4 and the gas temperature detector portion 5, the film thickness of the first wiring portions 22D can be increased without increasing the film thickness of the flow rate detector portion 4 or the gas temperature detector portion 5. Thus, the resistance in the first wiring portions 22D can be lowered without reducing the sensitivity of the flow rate detector portion 4 or the gas temperature detector portion 5. Hence, the ratio of electrical resistance in the first wiring portions 22D relative to electrical resistance between the first and second gas temperature detection electrode terminals 6e and 6f is reduced, increasing the precision of the gas temperature detector portion 5 in detecting the temperature of the air.

Because the high-thermal-resistance portions 24 are formed in portions of the second wiring portions 23, heat transfer from the first wiring portions 22D through the second wiring portions 23 to the gas temperature detector portion 5 is interrupted at the high-thermal-resistance portions 24, reducing the quantity of heat conducted toward the gas temperature detector portion 5. Thus, reductions in the precision of the gas temperature detector portion 5 in detecting the temperature of the air resulting from the generation of heat by the flow rate detector portion 4 are suppressed, increasing the precision in detecting the temperature of the air.

Moreover, in Embodiment 5 above, aluminum is used for the material in the first wiring portions 22D, but the material in the first wiring portions 22D is not limited to aluminum provided that it is a material in which the temperature dependency of the resistance is less than that of the material in the flow rate detector portion 4 and the gas temperature detector portion 5, the latter in this case being platinum, and for example, a metal such as copper, gold, silver, etc., or an alloy containing any of these as a major constituent can be used.

In Embodiment 5 above, the entire region of the first wiring portions 22D is made of aluminum, but it is not necessary for the entire region of the first wiring portions 22D to be made of aluminum and it is sufficient that at least a portion of the first wiring portions 22D be made of aluminum.

In Embodiment 5 above, the second wiring portions 23 is made of the same material as the material in the flow rate detector portion 4 and the gas temperature detector portion 5 (platinum), but the second wiring portions 23 may also be made of the same material as the first wiring portions 22D. In that case, the ratio of changes in resistance of the second wiring portions 23 relative to changes in resistance between the electrode terminals 6e and 6f resulting from temperature changes is extremely small, increasing the precision of the gas temperature detector portion 5 in detecting air temperature.

Embodiment 6

Figure 7:
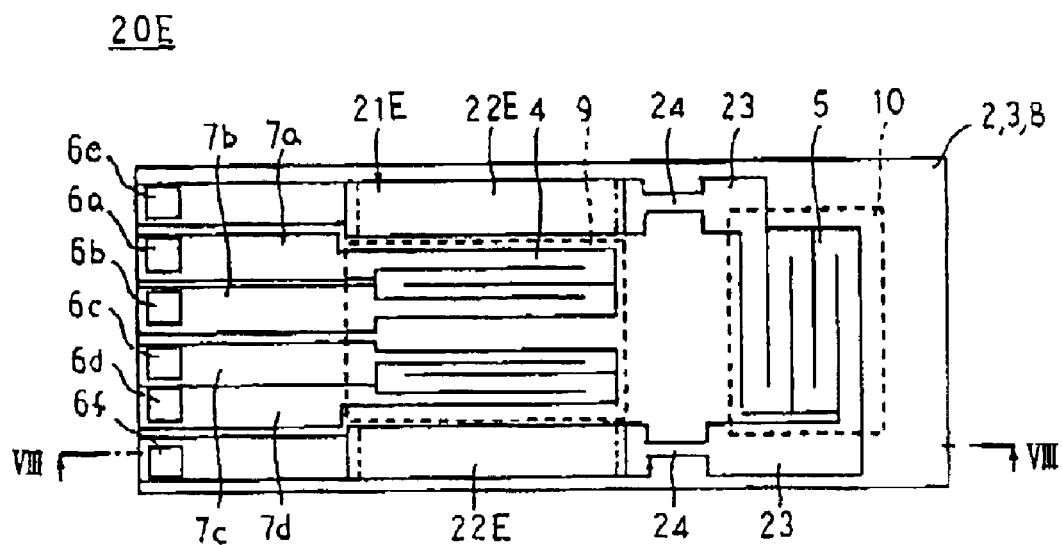
FIG. 7 is a top view showing a gas flow rate and temperature measuring element according to Embodiment 6 of the present invention.
Figure 8:
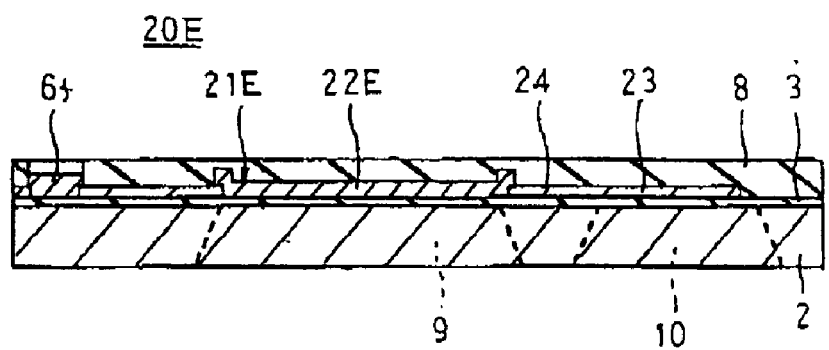
FIG. 8 is a cross section taken along line VIII—VIII in FIG. 7 viewed from the direction of the arrows.
Figure 9:
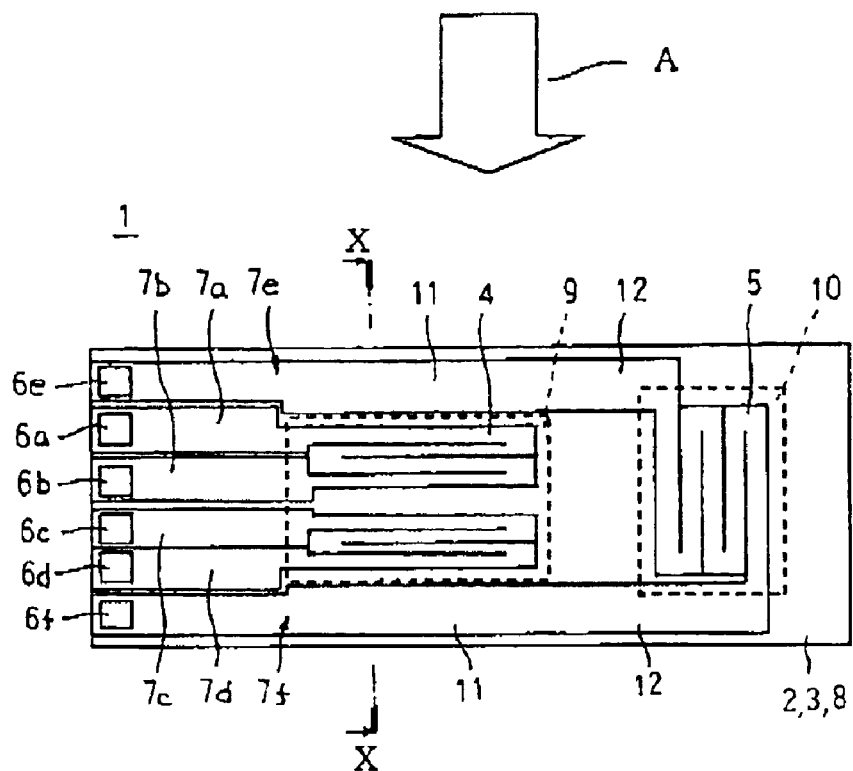
FIG. 9 is a top view showing a conventional gas flow rate and temperature measuring element.
Figure 10:
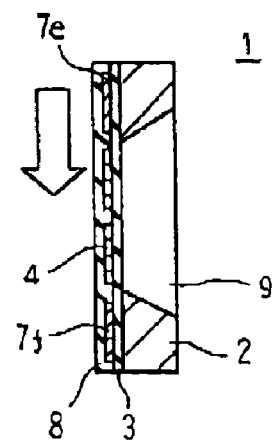
FIG. 10 is a cross section taken along line X—X in FIG. 9 viewed from the direction of the arrows.

FIG. 7 is a top view showing a gas flow rate and temperature measuring element according to Embodiment 6 of the present invention, and FIG. 8 is a cross section taken along line VIII—VIII in FIG. 7 viewed from the direction of the arrows.

In FIGS. 7 and 8, gas temperature detection wiring 21E has first wiring portions 22E disposed parallel to and in close proximity to a flow rate detector portion 4 for a length generally equivalent to that of the flow rate detector portion 4; and second wiring portions 23D disposed so as to extend from the first wiring portions 22E to end portions of a pectinate pattern of a gas temperature detector portion 5, high-thermal-resistance portions 24 being formed in portions of the second wiring portions 23, and the gas temperature detection wiring 21E being formed so as to connect first and second gas temperature detection electrode terminals 6e and 6f and first and second ends of the pectinate pattern of the gas temperature detector portion 5. The first wiring portions 22E and the electrode terminals 6a to 6f are made of a material in which the temperature dependency of the resistance is less than that of the material in the flow rate detector portion 4 and the gas temperature detector portion 5, the latter in this case being platinum.

Moreover, Embodiment 6 is constructed in a similar manner to Embodiment 5 above except for the fact that the electrode terminals 6a to 6f are made of the same material as the first wiring portions 22E.

A method for manufacturing a gas flow rate and temperature measuring element 20E will now be explained.

First, the electrically-insulating support film 3 is formed on the flat substrate 2 by forming a film of silicon nitride to a thickness of 1.0 μm, for example, over the entire front surface of the flat substrate 2. Next, a film of platinum is formed to a thickness of 0.2 μm, for example, over an entire front surface of the electrically-insulating support film 3.

Next, the flow rate detector portion 4 and the gas temperature detector portion 5 having pectinate patterns, the flow rate detection wiring 7a to 7d, and the gas temperature detection wiring 21E are formed by patterning the platinum film using a method such as photoengraving, wet etching (or dry etching), etc. At this time, portions corresponding to the first wiring portions 22E and the electrode terminals 6a to 6f are removed.

Next, a film of aluminum is formed to a thickness of 0.2 μm, for example, on the front surface of the electrically-insulating support film 3 so as to link the removed portions of the gas temperature detection wiring 21E and on the regions of formation of the electrode terminals 6a to 6f.

Next, the electrically-insulating protective film 8 is formed by forming a film of silicon nitride to a thickness of 1.0 μm, for example, over the entire front surface of the electrically-insulating support film 3. Then, the electrically-insulating protective film 8 is removed above the electrode terminals 6a to 6f. Finally, the first and second cavities 9 and 10 are formed in a similar manner to Embodiment 5 above to obtain the gas flow rate and temperature measuring element 20E.

In the gas flow rate and temperature measuring element 20E prepared in this manner, because the first wiring portions 22E are made of aluminum, in a similar manner to Embodiment 5 above, the ratio of changes in resistance of the first wiring portions 22E relative to changes in resistance between the electrode terminals 6e and 6f resulting from temperature changes is extremely small, increasing the precision of the gas temperature detector portion 5 in detecting the temperature of the air. Furthermore, in a similar manner to Embodiment 5 above, the film thickness of the first wiring portions 22E can be increased without increasing the film thickness of the flow rate detector portion 4 or the gas temperature detector portion 5, enabling the resistance in the first wiring portions 22E to be lowered without reducing the sensitivity of the flow rate detector portion 4 or the gas temperature detector portion 5. Thus, the ratio of electrical resistance in the first wiring portions 22E relative to electrical resistance between the first and second gas temperature detection electrode terminals 6e and 6f is reduced, increasing the precision of the gas temperature detector portion 5 in detecting the temperature of the air.

Because the high-thermal-resistance portions 24 are formed in portions of the second wiring portions 23, in a similar manner to Embodiment 5 above, reductions in the precision of the gas temperature detector portion 5 in detecting the temperature of the air resulting from the generation of heat by the flow rate detector portion 4 are suppressed, increasing the precision in detecting the temperature of the air.

Because the electrode terminals 6a to 6f are made of aluminum, which has a lower hardness than platinum, the electrode terminals 6a to 6f function as a buffer layer when wire bonding is being applied to the electrode terminals 6a to 6f, enabling damage to the flat substrate 2 to be reduced. Because the aluminum forming the electrode terminals 6a to 6f has a hardness equivalent to that of the bonding wires, bonding stability is improved. Thus, a gas flow rate and temperature measuring element having a high rate of production and reliability is obtained.

Because the electrode terminals 6a to 6f are made of a different material than the flow rate detector portion 4 and the gas temperature detector portion 5, the film thickness of the electrode terminals 6a to 6f can be increased without increasing the film thickness of the flow rate detector portion 4 or the gas temperature detector portion 5. Thus, damage to the flat substrate 2 due to wire bonding can be reduced without reducing the sensitivity of the flow rate detector portion 4 or the gas temperature detector portion 5.

Moreover, in Embodiment 6 above, aluminum is used for the material in the first wiring portions 22E and the electrode terminals 6a to 6f, but the material in the first wiring portions 22E and the electrode terminals 6a to 6f is not limited to aluminum provided that it is a material in which the temperature dependency of the resistance is less than that of the material in the flow rate detector portion 4 and the gas temperature detector portion 5, the latter in this case being platinum. If consideration is given to reducing damage to the flat substrate 2 due to wire bonding, it is desirable for the electrode terminals 6a to 6f to have a lower hardness than that of the flat substrate 2 and have a hardness equivalent to that of conventional bonding wires having gold or aluminum as a major constituent, and for example, a metal such as copper, gold, silver, etc., or an alloy containing any of these as a major constituent can be used.

In Embodiment 6 above, the second wiring portions 23 is made of the same material as the material in the flow rate detector portion 4 and the gas temperature detector portion 5 (platinum), but the second wiring portions 23 may also be made of the same material as the first wiring portions 22E. In that case, the ratio of changes in resistance of the second wiring portions 23 relative to changes in resistance between the electrode terminals 6e and 6f resulting from temperature changes is extremely small, increasing the precision of the gas temperature detector portion 5 in detecting air temperature.

Moreover, in each of the above embodiments, a gas flow rate and temperature measuring element in which the flow rate detector portion 4 and the gas temperature detector portion 5 are formed on a flat substrate 2 has been explained, but the present invention is not limited to this configuration. In the conventional technique described in Japanese Patent Laid-Open No. HEI 8-219838 (Gazette), for example, an air temperature compensating resistance element for compensating for air temperature characteristics in a flow rate detecting thermosensitive resistor and a thermosensitive resistance element for measuring air temperature for use in fuel control of an internal combustion engine are supported by separate members, but the constructions in each of the above embodiments may also be applied to wiring portions in close proximity to the flow rate detecting thermosensitive resistor if the flow rate detecting thermosensitive resistor, the air temperature compensating resistance element, and the thermosensitive resistance element are formed on a flat substrate 2. In that case, similar effects to those of the present application are obtained and further reductions in the size of the system are enabled.

What is claimed is:

1. A gas flow rate and temperature measuring element comprising:

a flat substrate;

a flow rate detector portion made of a thermosensitive resistor film formed on a front surface of said flat substrate;

a gas temperature detector portion made of a thermosensitive resistor film formed on said front surface of said flat substrate so as to be separated from said flow rate detector portion;

flow rate detection and gas temperature detection electrode terminals formed on an end portion of said front surface of said flat substrate across said flow rate detector portion from said gas temperature detector portion;

flow rate detection wiring formed on said front surface of said flat substrate so as to connect said flow rate detection electrode terminals and said flow rate detector portion;

gas temperature detection wiring formed on said front surface of said flat substrate so as to connect said gas temperature detection electrode terminals and said gas temperature detector portion; and cavities formed from a rear surface side of said flat substrate under said flow rate detector portion and said gas temperature detector portion, respectively, wherein said gas temperature detection wiring is provided with:

a first wiring portion disposed parallel to and in close proximity to said flow rate detector portion for a length substantially equivalent to a length of said flow rate detector portion; and a second wiring portion disposed so as to extend from said first wiring portion to said gas temperature detector portion, a high-thermal-resistance portion being formed in at least a portion of said second wiring portion.

2. The gas flow rate and temperature measuring element according to claim 1, wherein:

said high-thermal-resistance portion is constructed by reducing a heat-conducting cross-sectional area of said second wiring portion.

3. The gas flow rate and temperature measuring element according to claim 1, wherein:

said high-thermal-resistance portion is constructed using a material having a lower coefficient of thermal conductivity than said first and second wiring portions.

4. A gas flow rate and temperature measuring element comprising:

a flat substrate;

a flow rate detector portion made of a thermosensitive resistor film formed on a front surface of said flat substrate;

a gas temperature detector portion made of a thermosensitive resistor film formed on said front surface of said flat substrate so as to be separated from said flow rate detector portion;

flow rate detection and gas temperature detection electrode terminals formed on an end portion of said front surface of said flat substrate across said flow rate detector portion from said gas temperature detector portion;

flow rate detection wiring formed on said front surface of said flat substrate so as to connect said flow rate detection electrode terminals and said flow rate detector portion;

gas temperature detection wiring formed on said front surface of said flat substrate so as to connect said gas temperature detection electrode terminals and said gas temperature detector portion; and cavities formed from a rear surface side of said flat substrate under said flow rate detector portion and said gas temperature detector portion, respectively, wherein said gas temperature detection wiring is provided with:

a first wiring portion disposed parallel to and in close proximity to said flow rate detector portion for a length substantially equivalent to a length of said flow rate detector portion; and a second wiring portion disposed so as to extend from said first wiring portion to said gas temperature detector portion, said first wiring portion being formed into a thicker film than said flow rate detector portion and said gas temperature detector portion.

5. The gas flow rate and temperature measuring element according to claim 4, wherein:

said flow rate detection and gas temperature detection electrode terminals are formed to a similar film thickness using a similar material to said first wiring portion.

6. A gas flow rate and temperature measuring element comprising:

a flat substrate;

a flow rate detector portion made of a thermosensitive resistor film formed on a front surface of said flat substrate;

a gas temperature detector portion made of a thermosensitive resistor film formed on said front surface of said flat substrate so as to be separated from said flow rate detector portion;

flow rate detection and gas temperature detection electrode terminals formed on an end portion of said front surface of said flat substrate across said flow rate detector portion from said gas temperature detector portion;

flow rate detection wiring formed on said front surface of said flat substrate so as to connect said flow rate detection electrode terminals and said flow rate detector portion;

gas temperature detection wiring formed on said front surface of said flat substrate so as to connect said gas temperature detection electrode terminals and said gas temperature detector portion; and cavities formed from a rear surface side of said flat substrate under said flow rate detector portion and said gas temperature detector portion, respectively, wherein said gas temperature detection wiring is provided with:

a first wiring portion disposed parallel to and in close proximity to said flow rate detector portion for a length substantially equivalent to a length of said flow rate detector portion; and a second wiring portion disposed so as to extend from said first wiring portion to said gas temperature detector portion, at least a portion of said first wiring portion being constructed using a material whose electrical resistance has less temperature dependency than that of said flow rate detector portion and said gas temperature detector portion.

7. The gas flow rate and temperature measuring element according to claim 6, wherein:

said portion of said first wiring portion constructed using said material whose electrical resistance has less temperature dependency is formed into a thicker film than said flow rate detector portion and said gas temperature detector portion.

8. The gas flow rate and temperature measuring element according to claim 7, wherein:

said flow rate detection and gas temperature detection electrode terminals are formed to a similar film thickness using a similar material to said portion of said first wiring portion constructed using said material whose electrical resistance has less temperature dependency.

* * * * *